United States Patent Office 2,967,031
Patented Jan. 3, 1961

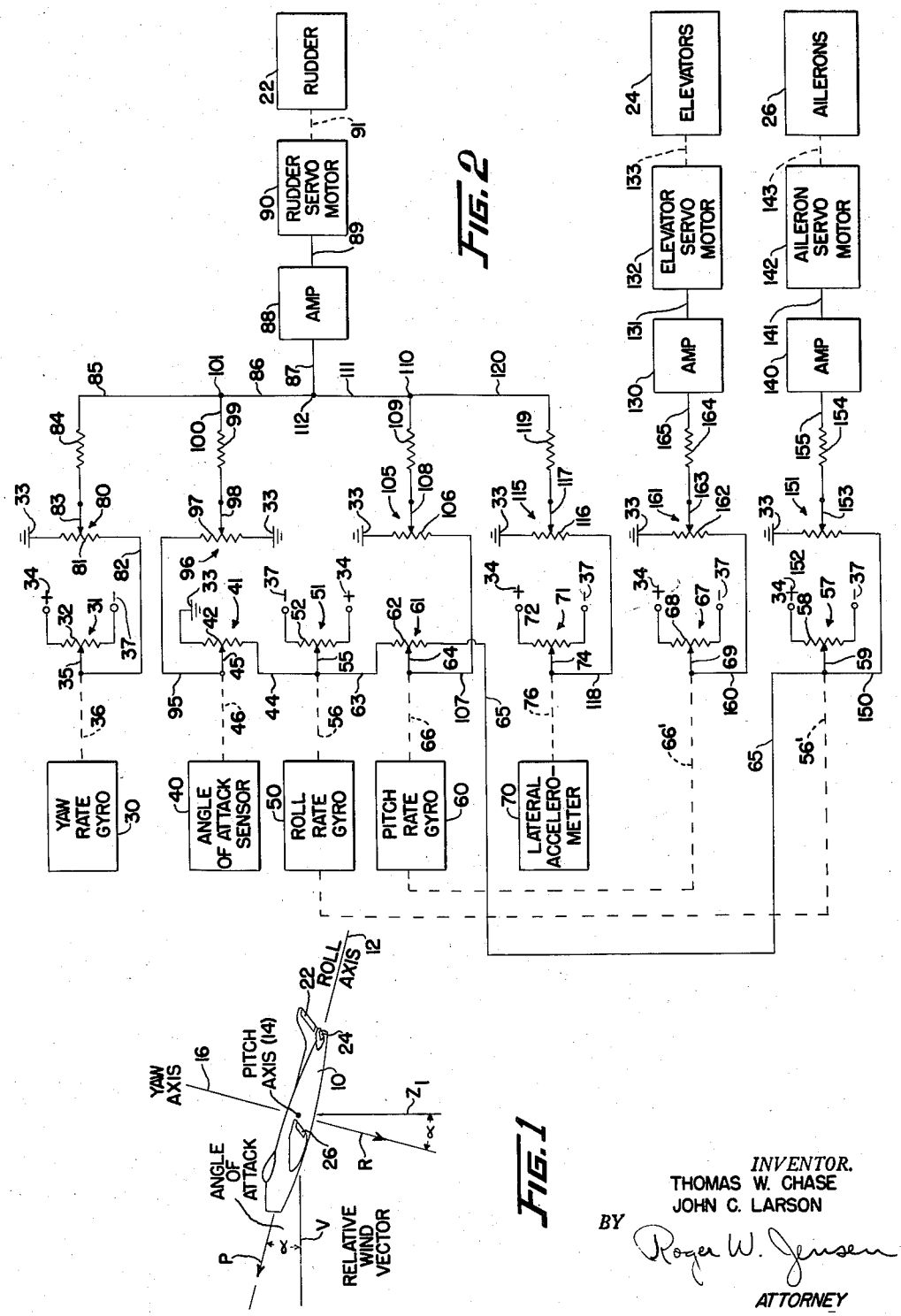

2,967,031
CONTROL APPARATUS FOR DIRIGIBLE CRAFT

Thomas W. Chase, St. Louis Park, and John C. Larson, Minneapolis, Minn., assignors to Minneapolis-Honeywell Regulator Company, Minneapolis, Minn., a corporation of Delaware Filed Oct. 29, 1956, Ser. No. 618,732

9 Claims. (Cl. 244—77)

This invention pertains generally to control apparatus for dirigible craft and has specific application in high performance aircraft. The present invention may be applied to an aircraft to serve as a "yaw damper" or, stated otherwise, serves to stabilize the aircraft about its yaw axis.

One style of air frame construction currently used involves having a relatively short wing span in comparison to the length of the fuselage. With this type of construction the moment of inertia about the roll axis is relatively quite small and the moments of inertia about the pitch and yaw axes are relatively large. It has been found that with this construction that certain aircraft maneuvers involving rate of change of the aircraft about both its pitch and roll axes cause a resultant yaw acceleration which makes the aircraft unstable about the yaw axis. One aspect of the present invention includes obtaining a signal proportional to the rate of change of the aircraft about the roll axis and multiplying it by a signal proportional to the rate of change of the aircraft about the pitch axis and applying the resultant signal to signal responsive means controlling the rudder of the aircraft. This serves to damp out the acceleration about the yaw axis caused by the turning about the roll and pitch axes.

It has also been determined that when high performance aircraft of this type tend to roll about their roll or longitudinal axis that any difference between said longitudinal axis and the relative wind vector results in a lateral acceleration to the aircraft. This in turn leads to unwanted sideslip. In prior art yaw damping control systems it has been customary to obtain a signal proportional to the rate of change about the plane's yaw axis and apply that into the rudder channel. However, when there is a substantial difference between the plane's longitudinal axis and the relative wind vector of the aircraft, there will be unsatisfactory results experienced by merely obtaining a signal proportional to rate of change of the craft about its yaw axis and applying that into the rudder channel. A further aspect of the present invention therefore is to overcome this problem by obtaining a signal proportional to the rate of change of the craft about its yaw axis and subtracting therefrom a signal proportional to the product of a signal proportional to the rate of change of the craft about its roll axis and a signal proportional to the angle of attack of the aircraft, this combined signal then being applied to the rudder channel of the aircraft.

An object of the invention therefore is to provide an improved control apparatus for dirigible craft.

A further object of the invention is to provide an improved yaw damper for dirigible craft.

These and other objects will become more apparent from a reading of the following specification and appended claims in conjunction with the accompanying drawings in which:

Figure 1 is a side view of an aircraft with its roll, pitch, and yaw axes as well as its angle of attack being represented; and Figure 2 is a schematic diagram of an aircraft control system incorporating the features of the invention.

Referring to Figure 1 an aircraft 10 has a roll axis 12, a pitch axis 14, and a yaw axis 16. At any given flight condition, the relative wind vector, identified by reference figure V, and the aircraft roll axis 12 define an angle of attack which is identified by the reference figure $\alpha$. Aircraft 10 has rudder means 22, elevator means 24, and aileron means 26 controllable by suitable means for controlling aircraft 10 about its yaw axis 16, pitch axis 14, and roll axis 12 respectively.

The relative wind vector V may be assumed to lie in a plane defined by the aircraft's roll and yaw axes. At high yawing rates, as pointed out above, the aircraft will tend to yaw about an apparent yaw axis lying in the plane defined by the aircraft's roll and yaw axes and which is perpendicular to the relative wind vector V. The apparent yaw axis so defined is identified in Figure 1 by the reference figure $Z_1$. Since the roll and yaw axes 12 and 16 and the relative wind vectors V and the apparent yaw axis $Z_1$ are coplanar it follows that the apparent yaw axis $Z_1$ and the regular yaw axis 16 are separated by the angle of attack $\alpha$.

A sensing device such as a roll rate gyro senses the rate of turn of aircraft 10 about its roll axis 12 and which is represented in Figure 1 as a vector P lying along the roll axis 12. Another sensing device such as a yaw rate gyro senses the rate of turn of aircraft 10 about the yaw axis 16 which is represented in Figure 1 by a vector R lying along the yaw axis 16.

As pointed out above, the aircraft 10 will have a tendency to yaw about the apparent yaw axis $Z_1$ for high yawing rates. It will be appreciated that the rate of turn about the apparent yaw axis $Z_1$ (represented by the symbol $R_1$) is:

$$R_1 = R \cos \alpha - P \sin \alpha$$

And since $$\sin \alpha \cong \alpha \text{ (radians)}$$

and $$\cos \alpha \cong 1$$

then $$R_1 \cong R - P\alpha$$

The aircraft control system shown in Figure 2 includes a yaw rate gyro 30, an angle of attack sensor 40, a roll rate gyro 50, a pitch rate gyro 60, and a lateral accelerometer 70. The invention does not involve specific details of sensors 30, 40, 50, 60 and 70 and hence they are shown in block diagram form only.

Yaw rate gyro 30 has associated therewith a signal producing means 31 comprising a resistive member 32 connected at one end to a source of positive direct current potential 34 and connected at the other end to a source of negative direct current potential 37. A wiper member 35 of signal producing means 31 is adapted to engage resistive portion 32 and is connected through a suitable connection 36 to the yaw gyro 30. Wiper 35 moves toward the positive end of resistive portion 32 for positive yaw rates of the aircraft.

A signal producing means 41 is associated with the angle of attack sensor 40 and comprises a resistive portion 42 connected at one end to ground 33 and at the other end by a lead 44. A wiper member 45 is adapted to engage resistive portion 42 and is connected through a suitable connection 46 to the angle of attack sensor 40. When the craft's angle of attack is zero, then wiper member 45 engages the grounded end of resistance portion 42. For positive values of angle of attack (such as shown in Figure 1) the wiper 45 moves toward the other end of resistance portion 42.

A first signal producing means associated with roll rate gyro 50 is identified by reference numeral 51 and comprises a resistive portion 52 connected at one end to the source of positive direct current potential 34 and at the other end to the source of negative direct current potential 37. A wiper member 55 is associated with resistive means 52 and is actuated by roll rate gyro 50 through a suitable connection 56.

A second signal producing means 57 is associated with the roll rate gyro 50 and comprises a resistive portion 58 connected at one end to the source of positive direct current potential 34 and at the other end to the source of negative direct current potential 37 and has associated therewith a wiper member 59 which is connected to roll rate gyro 50 through a suitable connection 56'. Connections 56 and 56' which connect roll rate gyro 50 to signal producing means 51 and 57 and the energization to resistive portions 52 and 58 of signal producing means 51 and 57 are such so that wiper member 55 is moved toward the negative end of resistive member 52 and wiper member 59 is moved toward the positive end of resistive member 58 for positive roll rates of the aircraft.

The pitch rate gyro 60 has associated therewith a first signal producing means 61 comprising a resistive portion 62 connected at one end by a lead 63 to wiper 55 of the first signal producing means 51 associated with the roll rate gyro 50 and at the other end to a lead 65 which in turn is connected to wiper 59 of the second signal producing means 57 associated with the roll rate gyro 50. Also connected to wiper 55 of signal producing means 51 is lead 44 connected to one side of the resistive means 42 of the signal producing means 41 actuated by the angle of attack sensor 40. A wiper 64 is adapted to engage resistive portion 62 of said first signal producing means 61 and is actuated by the pitch rate gyro 60 through a suitable connection 66. A second signal producing means 67 is associated with the pitch rate gyro 60 and comprises a resistive portion 68 connected at one end to the source of positive direct current potential 34 and at the other end to the source of negative direct current potential 37 and has associated therewith a wiper member 69 which is connected to the pitch rate gyro 60 through a suitable connection 66'.

The lateral accelerometer 70 has associated therewith a signal producing means 71 comprising a resistive portion 72 connected at one end to the source of positive direct current potential 34 and at the other end to the source of negative direct current potential 37 and further has associated therewith a wiper member 74 actuated by the lateral accelerometer 70 through a suitable connection 76.

A potentiometer 80 is used to modify the signal developed in signal producing means 31 which actuates by the yaw gyro 30 according to design requirements. Potentiometer 80 comprises a resistive portion 81 connected at one end to ground 33 and at the other end by a lead 82 to wiper 36 of signal producing means 31. Potentiometer 80 further comprises a wiper member 83 which engages resistive portion 81 and which is connected to one side of a summing resistor 84 the other side of which is connected through leads 85, 86, 87 to an amplifier 88 having an output represented by a lead 89 connected to a rudder servomotor 90 which actuates through a suitable mechanical connection 91 the rudder 22 of the aircraft 10.

As indicated above, a lead 44 is connected from the wiper 55 of the first signal producing means 51 associated with the roll rate gyro 50 to one end of the resistive portion 42 of the signal producing means associated with the angle of attack sensor 40. Since the other end of resistive portion 42 is grounded it follows that the energization through resistive member 42 is proportional to the position of wiper 55 relative to resistive member 52 of the signal producing means 51. The wiper 45 of signal producing means 41 is actuated by the angle of attack sensor 40 and hence its position relative to resistive member 42 is a measure of the angle of attack of the aircraft 10 as sensed by the angle of attack sensor 40. A multiplication function is accomplished by the above described interconnection between signal producing means 51 and signal producing means 41. The output of this network as picked off by wiper 45 is thus the product of the rate of turn of aircraft 10 about the roll axis as sensed by roll rate gyro 50 times the angle of attack as sensed by the angle of attack sensor 40. The resultant output is then applied through a lead 95 from wiper 45 to one side of a resistive portion 97 of a potentiometer 96, resistive member 97 being grounded on the other side at 33. A wiper member 98 of potentiometer 96 engages resistive portion 97 and its setting relative to resistive portion 97 constitutes a means of varying the authority of the signal at wiper 45 on the overall damping system. Wiper 98 is connected to one side of a summing resistor 99 the other side of which is connected through a lead 100 to a junction point 101 between leads 85 and 86 and thence the product of the roll rate times angle of attack as sensed at wiper 45 and as modified by potentiometer 96 is applied to amplifier 88 from junction point 101 through leads 86 and 87.

The roll rate gyro 50 output as sensed by wipers 55 and 59 is applied through leads 63 and 65 to energize the resistive portion 62 of potentiometer 61, the wiper 64 of which is actuated by the pitch rate gyro 60. The output of potentiometer 61 as sensed by wiper 64 is thus a product of the roll rate times the pitch rate and this resultant output is applied across the resistive portion 106 of a potentiometer 105 by a lead 107 connecting wiper 64 to one side of resistive member 106, the other side of which is grounded as at 33. Potentiometer 105 has a wiper member 108 which may be moved relative to resistive member 106 so as to constitute a means of varying the authority of the roll rate times pitch rate signal in the overall damping system. Wiper 108 is connected through a summing resistor 109, a junction point 110, and a lead 111 to a junction point 112 between leads 86 and 87 and thence through lead 87 to amplifier 88 which controls through the rudder servomotor 90 the rudder 22.

The lateral accelerometer 70 output signal as developed by the signal producing means 71 is modified, as dictated by systems requirements, by a potentiometer 115 having a resistive portion 116 and a wiper member 117 adjustable therewith. One side of resistive member 116 is connected through a lead 118 to wiper member 74 of the signal producing means 71 and the other side of resistive member 116 is grounded at 33. Wiper member 117 is connected through a summing resistor 119 and a lead 120 to junction point 110 and thence through lead 111, junction point 112, and lead 87 to amplifier 88.

The rudder channel of the control system thus has five sensing devices feeding a total of four signals into the amplifier 88 controlling through the rudder servomotor 90 and rudder 22. Parallel summing means have been used to apply the four signals to the amplifier 88 which is a convenient summing technique to use in connection with direct current signals. It will be understood by those skilled in the art, however, that other means of applying signals to the amplifier controlling the rudder 22 could be used such as, for example, series summing. Also the signals such as alternating current signals could be used instead of direct current signals.

The four signals fed into the rudder channel, above mentioned, are thus (a) the rate of turn of the aircraft 10 about the yaw axis 16 as sensed by gyro 30, developed in signal producing means 31 and modified by potentiometer 80; (b) the product of rate of turn about the roll axis 12 times angle of attack α as sensed by gyro 50, angle of attack sensor 40, developed in signal producing means 51 and 41 and as modified by potentiometer 96; (c) the product of rate of turn about the roll axis 12 times rate of turn about the pitch axis 14 as sensed by gyros 50 and 60, developed in signal producing means 51, 57 and 61, and modified by potentiometer 105; and (d) the lateral acceleration along the pitch axis 14 as sensed by accelerometer 70, developed in signal producing means 51 and modified by potentiometer 115. The development of a signal proportional to the rate of turn about the yaw axis and subtracting from it a signal proportional to the rate of turn about the roll axis times the angle of attack satisfies the equation:

$$R_1 \cong R - P\alpha$$

developed above and thus solves the problem described above of the aircraft receiving a lateral acceleration upon rolling about its roll axis when there is a difference between the craft's longitudinal axis and the relative wind vector. The subtraction of signals is accomplished by the control system herein described by having the wiper 35 of yaw rate signal producing means 31 move toward the positive end of resistance member 32 for positive yaw rates of the aircraft, by having the wiper 55 of roll rate signal producing means move toward the negative end of resistance member 52 for positive roll rates of the aircraft, by having the wiper 45 of the angle of attack signal producing means 41 move toward the ungrounded end of resistance portion 42 for positive values of angle of attack of the aircraft, and by summing the signals together as an input to amplifier 88 in the summing network above described.

Also, the development of a signal proportional to the product of the rate of turn of the aircraft about the roll axis 12 times the rate of turn of the aircraft about the pitch axis 14 and applying the signal to the rudder channel solves the problem as described above of the acceleration about the yaw axis developed in an aircraft having a relatively low moment of inertia about the roll axis as compared to the moments of inertia about the pitch and yaw axes when the aircraft is being subjected to rate of change about both its roll and pitch axes.

The polarity or sense of the roll rate times pitch rate signal is negative for positive roll rates and positive pitch rates because the wiper 64 of the pitch rate signal producing means 61 moves toward the end of resistance portion 62 connected to wiper 55 for positive pitch rates and wiper 55 in turn moves toward the negative end of resistance portion 52 of roll rate signal producing means 51 for positive roll rates.

Additional means for damping movement of aircraft 10 about the roll and pitch axes 12 and 14 are provided. The pitch damper comprises in part an amplifier 130 connected through a lead 131 to an elevator servomotor 132 which drives through a suitable mechanical connection 133 and drives the elevator means 24 of the aircraft 10.

The roll damper comprises in part an amplifier 140 connected by a lead 141 to an aileron servomotor 142 which in turn is connected through a suitable mechanical connection 143 to the ailerons 26 of the aircraft 10.

A damping signal for controlling the aileron means 26 is developed by the roll rate gyro 50 through the connection 56' to the signal producing means 57 and the output thereof as sensed by wiper 59 is applied through a lead 150 to a potentiometer 151 having a resistive member 152 connected at one end by lead 150 and connected to ground 33 at the other. A wiper 153 of potentiometer 151 engages resistive member 152 and is connected to one side of a summing resistor 154 the other side of which is conected through a lead 155 to the aileron amplifier 140. Wiper member 153 is adjusted relative to resistive member 152 to obtain the desired amount of damping for the particular aircraft on which the control system is installed. The tendency of the aircraft 10 to deviate about the roll axis 12 will be sensed by the roll rate gyro 50 causing a signal to be developed in the signal producing means 57 and applied through potentiometer 151 to the amplifier 140 which will energize the aileron servomotor in such a way so as to cause a deflection of the ailerons 144 in a direction which will tend to oppose the turning of the aircraft about the roll axis 12.

The input to the elevator amplifier 130 is developed in the second signal producing means 67 associated with the pitch rate gyro 60. A potentiometer 161 is used to modify the signal developed by signal producing means 67 according to the damping needed for the particular aircraft involved. Potentiometer 161 comprises a resistive portion 162 connected at one end through a lead 160 to wiper 69 of the signal producing means 67 and connected at the other end to ground 33. A wiper 163 of potentiometer 161 engages resistive member 162 and is connected through a summing resistor 164 and a lead 165 to the elevator amplifier 130. Rate of turn of the aircraft 10 about the pitch axis 14 will be sensed by the pitch rate gyro 60 so as to develop a signal in the signal producing means 67 which signal, as modified by potentiometer 161, is applied to amplifier 130 so as to energize elevator servomotor 132 to drive elevators 134 in a direction which will tend to stop the movement of the aircraft about the pitch axis.

The present invention has been shown as applied to a damping system for a dirigible craft. The present invention may be used not only as a damper as shown but also may be used in connection with a more complete automatic control system including other reference sensors such as a gyro horizon or vertical gyro and directional gyroscope or other directional reference.

While we have shown and described specific embodiments of this invention, further modification and improvement will occur to those skilled in the art. We desire it to be understood, therefore, that this invention is not limited to the particular form shown and we intend that the appended claims cover all modifications which do not depart from the spirit and scope of the invention.

What we claim is:

1. In apparatus for controlling the attitude of a dirigble craft having roll, pitch, and yaw axes: control surface means for controlling the attitude of said craft about said yaw axis; motor means operatively connected to said control surface means; signal responsive means controlling said motor means; means on said craft for sensing rate of turn of said craft about said roll axis; means on said craft for sensing rate of turn of said craft about said pitch axis; means on said craft for sensing rate of turn of said craft about said yaw axis; an angle of attack sensing device; signal producing means operated by said rate of turn sensing means and by said device so as to produce separate signals proportional to rate of turn of said craft about said roll, pitch, and yaw axes and to angle of attack of said craft; means multiplying said roll rate of turn signal by said pitch rate of turn signal so as to produce a first resulting signal; means multiplying said roll rate of turn signal by said angle of attack signal so as to produce a second resultant signal; and means combining said first and second resultant signals and said yaw rate of turn signal and applying said combined signals to said signal responsive means.

2. In apparatus for controlling the attitude of a dirigible craft having roll, pitch, and yaw axes: control means for controlling the attitude of said craft about said yaw axis; signal responsive means controlling said control means; means on said craft for sensing rate of turn of said craft about said roll axis; means on said craft for sensing rate of turn of said craft about said pitch axis; means on said craft for sensing rate of turn of said craft about said yaw axis; angle of attack sensing means; signal producing means operated by said sensing means so as to produce separate signals as a function of rate of turn of said craft about said roll, pitch, and yaw axes and of angle of attack of said craft; means multiplying said roll rate of turn signal by said pitch rate of turn signal so as to produce a first resultant signal; means multiplying said roll rate of turn signal by said angle of attack signal so as to produce a second resultant signal;

and means combining said first and second resultant signals and said yaw rate of turn signal and applying said combined signals to said signal responsive means.

3. In apparatus for controlling the attitude of a dirigible craft having roll, pitch, and yaw axes: control surface means for controlling the attitude of said craft about said yaw axis; motor means operatively connected to said control surface means; signal responsive means controlling said motor means; means on said craft for sensing rate of turn of said craft about said roll axis; means on said craft for sensing rate of turn of said craft about said yaw axis; an angle of attack sensing device; signal producing means operated by said sensing means so as to produce separate signals proportional to rate of turn of said craft about said roll and yaw axes and to angle of attack of said craft; means multiplying said roll rate of turn signal by said angle of attack signal so as to produce a resultant signal; and means combining said resultant signal and said yaw rate of turn signal and applying said combined signals to said signal responsive means.

4. In apparatus for controlling the attitude of a dirigible craft having roll, pitch, and yaw axes: control means for controlling the attitude of said craft about said yaw axis; signal responsive means controlling said control means; means on said craft for sensing rate of turn of said craft about said roll axis; means on said craft for sensing rate of turn of said craft about said yaw axis; angle of attack sensing meeans; signal producing means operated by said sensing means so as to produce separate signals as a function of rate of turn of said craft about said roll and yaw axes and of angle of attack of said craft; means multiplying said roll rate of turn signal by said angle of attack signal so as to produce a resultant signal; and means combining said resultant signal and said yaw rate of turn signal and applying said combined signals to said signal responsive means.

5. In apparatus for controlling the attitude of a dirigible craft having roll, pitch, and yaw axes: control surface means for controlling the attitude of said craft about said axes; motor means operatively connected to said control surface means; signal responsive means controlling said motor means; means on said craft for sensing rate of turn of said craft about said axes; means on said craft sensing the angle of attack of said craft; means on said craft sensing acceleration of said craft along said pitch axis; signal producing means operated by said sensing means and producing separate signals as a function of rate of turn of said craft about said axes, of angle of attack, and of acceleration along said pitch axis; means multiplying said roll rate of turn signal by said pitch rate of turn signal so as to produce a first resultant signal; means multiplying said roll rate of turn signal by said angle of attack signal so as to produce a second resultant signal; means combining said resultant signals, said yaw rate of turn signal and said acceleration signal and applying said combined signal to the signal responsive means controlling said craft about said yaw axis, said resultant signals having a sense opposite to the sense of said other signals; and means applying said roll rate of turn signal and said pitch rate of turn signal to the signal responsive means controlling said craft about said roll and pitch axes respectively.

6. In apparatus for controlling the attitude of a dirigible craft having roll, pitch, and yaw axes; control means for controlling the attitude of said craft about said yaw axis; signal responsive means controlling said control means; means on said craft for sensing rate of turn of said craft about said axes; means on said craft sensing the angle of attack of said craft; means on said craft sensing acceleration of said craft along said pitch axis; signal producing means operated by said sensing means and producing separate signals as a function of rate of turn of said craft about said axes, of angle of attack, and of acceleration along said pitch axis; means multiplying said roll rate of turn signal by said pitch rate of turn signal so as to produce a first resultant signal; means multiplying said roll rate of turn signal by said angle of attack signal so as to produce a second resultant signal; and means combining said resultant signals, said yaw rate of turn signal and said acceleration signal and applying said combined signal to the signal responsive means controlling said craft about said yaw axis, said resultant signals having a sense opposite to the sense of said yaw rate of turn and acceleration signals.

7. In apparatus for controlling the attitude of a dirigible craft having roll, pitch, and yaw axes: control means for controlling the attitude of said craft about said yaw axis; signal responsive means controlling said control means; means on said craft for sensing rate of turn of said craft about said yaw and roll axes; means on said craft sensing the angle of attack of said craft; signal producing means operated by said sensing means and producing separate signals as a function of rate of turn of said craft about said yaw and roll axes and of angle of attack; means multiplying said roll rate of turn signal by said angle of attack signal so as to produce a resultant signal; means combining said resultant signal and said yaw rate of turn signal and applying said combined signal to said signal responsive means controlling said craft about said yaw axis, said resultant signal having a sense opposite to the sense of said yaw rate signal.

8. In apparatus for controlling the attitude of a dirigible craft having roll, pitch, and yaw axes: control means for controlling the attitude of said craft about said yaw axis; signal responsive means controlling said control means; means on said craft for sensing rate of turn of said craft about said roll axis; means on said craft sensing the angle of attack of said craft; signal producing means operated by said sensing means and producing separate signals as a function of rate of turn of said craft about said roll axis and of angle of attack; means multiplying said roll rate of turn signal by said angle of attack signal so as to produce a resultant signal; means applying said resultant signal to said signal responsive means controlling said craft about said yaw axis.

9. Apparatus for automatically stabilizing a dirigible craft about a first principal axis thereof comprising means on said craft for deriving a signal in accordance with the product of the angular velocities of the craft about second and third principal axes thereof respectively, means on said craft for deriving a signal in accordance with the product of the angular velocity of the craft about said second principal axis and the angle of attack of said craft, and means responsive to said signals for controlling the motion of said craft about said first axis.

References Cited in the file of this patent
UNITED STATES PATENTS
2,196,385    De Florez et al. _____ Apr. 9, 1940